UNITED STATES PATENT OFFICE.

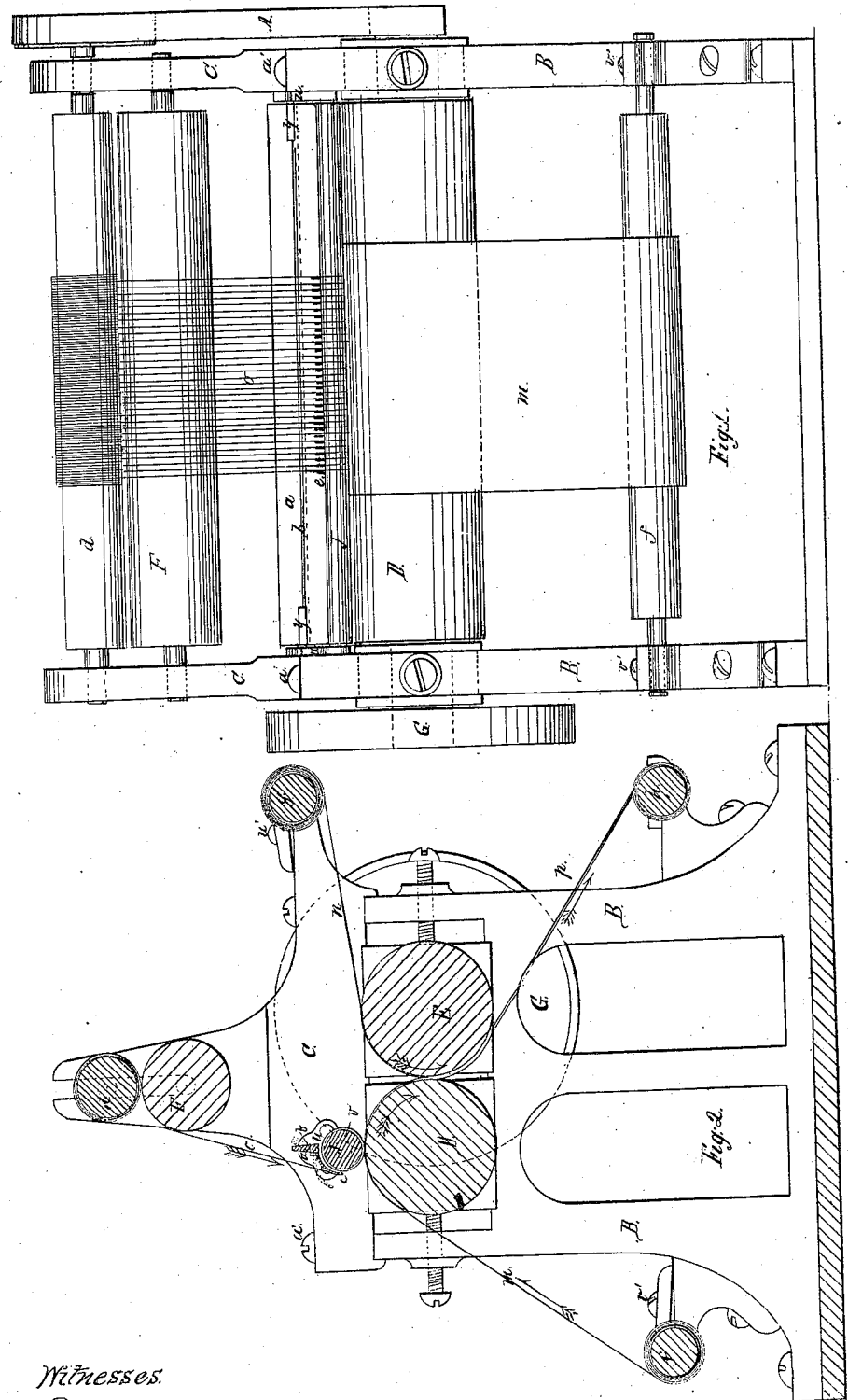
R. Solis.
Miscellaneous Weaving.
N° 30,891.   Patented Dec. 11, 1860.

RICHARD SOLIS, OF NEW BRUNSWICK, NEW JERSEY.

MACHINE FOR MAKING SHIRRED GOODS.

Specification of Letters Patent No. 30,891, dated December 11, 1860.

*To all whom it may concern:*

Be it known that I, RICHARD SOLIS, of New Brunswick, in the county of Middlesex and State of New Jersey, have invented a new and useful Improvement in Machines for Making Shirred Goods; and I do hereby declare that the following is a full, clear, and exact description of the same, reference being had to the accompanying drawings, making a part of this specification, in which—

Figure 1, is a front view. Fig. 2, is a transverse section.

Similar letters of reference in both figures represent like parts.

This invention consists in arranging the toothed guide, in shirring machines, down close to the revolving guide, and in pivoting the said toothed guide for convenience in "threading" it. By placing the toothed guide against the revolving guide, I prevent the possibility of any of the elastic threads from becoming displaced from their respective grooves in the said revolving or feed guide, which liability has heretofore proved a serious obstacle in the manufacture of shirred goods, the toothed guide having been placed several inches above the feed guide, so that the threads were very easily displaced on the feed roller by catching on the edge of the groove and "over riding", said grooves necessarily being very shallow. By securing a perfect adjustment of the elastic threads between the two lamina of cloth, I am enabled to make a better and much finer style of goods than can be produced by the old arrangement, because with my arrangement the rubber threads may be used so much finer and laid so much closer together that when the cloth contracts, it will have the appearance of a sheet of rubber between the two laminæ, thereby producing a much smoother face and texture than has heretofore been made.

To enable those skilled in the art to make and use my invention I will proceed to describe its construction and operation with reference to the drawings.

I use the shirring machine being constructed, arranged, and operating in all its parts in the ordinary way, except the toothed guide $b$, seen in Figs. 1 and 2. The blade $e$, is curved to correspond with the circle of the revolving guide J. The opposite edge of $b$, from the teeth, is turned up, forming a sort of a lip $a$, which is designed to stiffen the gage, and it also answers for a wing to take hold of when the blade $e$, is to be thrown up as shown by the red lines in Fig. 2. There is a fillet $y$, at each end of the guide $b$, extending into the hangers $u$, which are secured to the frame C, by screws. Said fillets $y$, constitute the pivots upon which the gage hangs, and turns, they being soldered or otherwise attached to it. The notches of the toothed gage $b$, must be made to register to the grooves $v$, (Fig. 2,) of the revolving guide J. Said notches are one quarter ($\frac{1}{4}$) of an inch deep, more or less.

Each groove $v$, around the roller J, must be sufficiently shallow, to be more than filled by its respective thread $o$, and consequently the said rubber threads $o$, are pressed by the revolving guide upon the lamina $m$. On account of the shallowness of these grooves $v$, when the toothed gage is placed so far from the guide J, as it has been heretofore, any slight variation in the movement of the lamina $m$, or even a twist in the thread (they being square) would cause it to catch on the edge of the groove and "override" and thereby leave a space in the manufactured fabric unsupplied with rubber and consequently decrease its value. But this liability is entirely obviated by placing the toothed gage $b$, down upon the gage J.

The rubber or elastic threads $o$, are placed on the spool, or roller $d$, which rests on F. The ends are then brought down in front of the rollers F, and J, one being placed in each groove $v$, of the guide roller J, between it and roller D, and between D and E, where they are held between the lamina $m$, and $n$, which have been previously placed on the rollers $f$, and $g$, and their ends also placed between the compressing rollers D, and E. The blade E, is then turned up as shown by the red lines in Fig. 2, and each thread is placed in the respective notch corresponding to the groove it occupies in the revolving guide J. After the threads $o$, are all placed the blade $e$, is turned down against the feed roller, or gage J, and the machine is ready for operation; $p$, represents the manufactured article which is wound upon the roller $h$.

G, is the driving pulley and imparts motion through E to D, and by the band A, from E, to $d$, the other parts receiving their motion, from these, as the cloths $m$ and $n$ and the threads $o$, are drawn in by the rollers D and E.

The cloth roller $f$, is prevented from turning too easily by tightening the screw $v'$ and by tightening the screw $u'$, the roller $g$, is made to turn harder; $h$, may be driven by a belt from $f$, or $g$.

What I claim as my invention and desire to secure by Letters Patent is;

1. Arranging the toothed guide $b$, in machines for manufacturing shirred or other elastic goods, down close to the revolving guide J, as and for the purpose specified.

2. The pivoted guide $a$, $b$, $e$, constructed arranged and operating substantially as and for the purposes set forth.

RICHARD SOLIS.

Witnesses:
L. W. BENDRÉ,
M. M. LIVINGSTON.